N. H. HASSEL.
VEHICLE TIRE.
APPLICATION FILED MAR. 13, 1915.
1,209,575.
Patented Dec. 19, 1916.
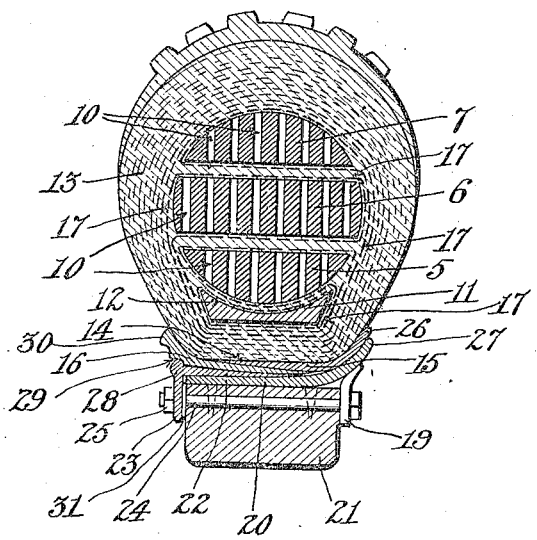
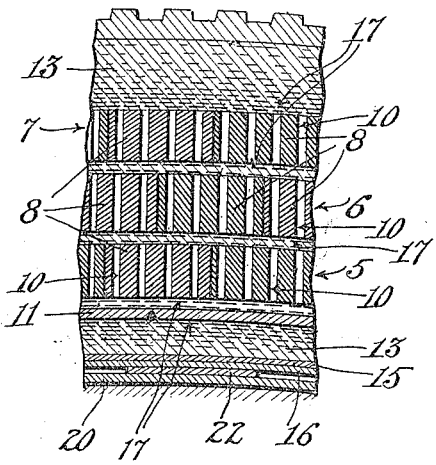
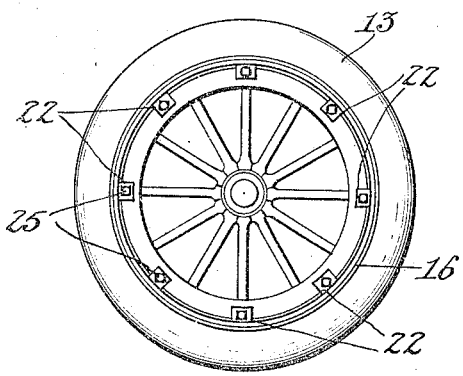
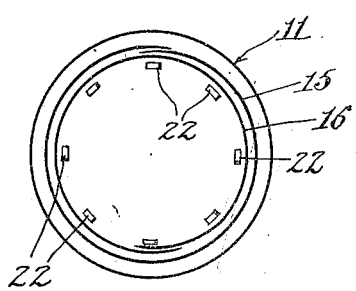

UNITED STATES PATENT OFFICE.

NELS H. HASSEL, OF BEVERLY HILLS, CALIFORNIA.

VEHICLE-TIRE.

1,209,575.  Specification of Letters Patent.  Patented Dec. 19, 1916.

Application filed March 13, 1915. Serial No. 14,256.

*To all whom it may concern:*

Be it known that I, NELS H. HASSEL, a citizen of the United States, residing at Beverly Hills, in the county of Los Angeles, State of California, have invented a new and useful Vehicle-Tire, of which the following is a specification.

My invention relates to vehicle tires and particularly to resilient tires such as are used upon automobiles and similar vehicles, and one of the main objects of my invention is to produce a tire of the class described of simple form and construction which has desirable pneumatic qualities without the use of inner tubes and valves and which is not subject to puncture.

Other objects and advantages will appear hereinafter from the following description.

Referring to the drawings which are for illustrative purposes only: Figure 1 shows a side elevation of a vehicle wheel as it appears equipped with a form of my invention. Fig. 2 is a cross sectional view of a tire embodying a form of my invention. Fig. 3 is a longitudinal sectional view of the tire shown in Fig. 2. Fig. 4 is a diagrammatic view of the metallic portions of the tire shown in Figs. 1 to 3.

The core of the tire consists of three circular rings of rubber or similar substance, being more particularly an inner ring 5, intermediate ring 6, and outer ring 7, which together in cross section form approximately a round or circular core. Each ring 5, 6, and 7 is composed of a plurality of blocks 8 of rubber each having extending therethrough a plurality of openings 10 which extend substantially radial to the tire. It is to be noted that the external faces of the respective rings 5, 6, and 7 when together, as shown in Fig. 2, are rounded. Spaced apart and immediately within the core is a circular metallic band 11, preferably of malleable iron, which is hollow on its outer face as indicated at 12 to conform to the shape of the inner face of the core of the tire.

Surrounding the core of the tire, extending through the spaces between the rings 5, 6, and 7 and between the ring 7 and the band 11 is a body of rubber 13 approximately in cross sectional area, of an oval form, the inner face of which is flattened as indicated as 14 to engage a seat formed by two metallic split rings 15 and 16 more fully hereinafter described.

17 designates reinforcement material, preferably woven fabric which is embedded and vulcanized in the rubber body 13. The fabric 17 is wrapped or wound about the band 11 thence around the inner ring 5, thence around the intermediate ring 6, thence around the outer ring 7, in each case passing around the band 11 thereby forming a reinforced body about the core of the tire which keeps the blocks 8 in place and firmly binds the respective rings 5, 6, and 7 within the body of the tire. The fabric reinforcement just described also materially assists in preserving the shape of the tire. The fabric 17 is preferably placed upon the rings 5, 6, and 7 close to the openings 10 formed therein so that during the vulcanizing operation the rubber of the body 13 does not enter the openings 10.

20 designates a metallic rim secured to the felly 21 of the wheel in any suitable manner and 22 designates a series of wedge plates which enter between the split ring 16 and the rim 20. The wedge plates 22 are each provided with a flange 23 which extends inwardly therefrom. The flange 23 is engaged by bolts 24 which extend through the felly and through clips 19 on the opposite side of the felly 21. Nuts 25 are provided for the bolts 24 by means of which the wedge plates 22 are forced between the ring 16 and the rim 20, thereby causing the split rings 16 and 15 to expand and compress or bind the rubber of the body 13 between the said split rings and the band 11, firmly holding the tire on the wheel. The split ring 15 is prevented from dislodgment sidewise by means of a flange 26 thereon which engages a flange 27 on the rim 20, and the split ring 16 is prevented from dislodgment sidewise by means of a rib 28, formed on each wedge plate 22, which engages a notched portion or groove 29 formed on a flange 30 on the split ring 16. The flange 30 on the split ring 16 and the flange 26 on the split ring 15, also form a portion of a seat for the body of the tire and prevent sidewise movement or displacement from the retaining structure.

It is to be noted that the openings 10 in the rings 5, 6, and 7 form a series of air pockets or cells in the tire which impart resiliency to the tire, the rings 5, 6, and 7 so constructed forming a core of air and rubber.

It is to be understood that the number of cells or air pockets 10 in the tire may be increased in size or that the number of such cells or air pockets may be varied to give a greater or less degree of resiliency to the tire.

31 designates a washer or filler between the side of the felly of the wheel and the flange 23 on the respective wedge plates 22 to prevent any twisting or bending of the flange 23. If the distance between the rim 20 and split rings 15 and 16 is great enough the wedge plates may enter a greater distance therebetween and in that case the washer 31 may be dispensed with.

What I claim is:

A tire comprising a rubber body, a series of rings of elastic material in said body, said rings each having a plurality of cells formed therein, a metallic band embedded wholly within said rubber body forming a seat for said rings, and a fabric reinforcement within said body wound around the respective rings and said band to bind the same together and to hold said rings against the seat in said band.

In testimony whereof, I have hereunto set my hand at Los Angeles, California, this 8th day of March, 1915.

NELS H. HASSEL.

In presence of—
 FRED A. MANSFIELD,
 P. H. SHELTON.